Nov. 7, 1967 T. HEHENKAMP 3,351,779
CIRCUIT FOR SUPPRESSION OF VOLTAGE PEAKS ACROSS A RECTIFIER
Filed Dec. 15, 1964

INVENTOR.
THEODORUS HEHENKAMP
BY
Frank R. Trifari
AGENT

United States Patent Office 3,351,779
Patented Nov. 7, 1967

3,351,779
CIRCUIT FOR SUPPRESSION OF VOLTAGE PEAKS ACROSS A RECTIFIER
Theodorus Hehenkamp, Emmasingel, Eindhoven, Netherlands, assignor to North American Philips Company, Inc., New York, N.Y., a corporation of Delaware
Filed Dec. 15, 1964, Ser. No. 418,511
Claims priority, application Netherlands, Jan. 11, 1964, 64—160
4 Claims. (Cl. 307—88.5)

ABSTRACT OF THE DISCLOSURE

A circuit arrangement for suppressing voltage peaks created across a rectifier which becomes blocked after a conduction period having at least two series connected semiconductor controlled rectifiers connected in series with a load and a supply. The load or supply is divided into a number of successive series connected sections equalling the number of series connected rectifiers. The other of the load or supply has a capacitive voltage divider connected across same, the divider having a number of taps. Each of the successive series connected sections is connected to a corresponding tapping on the capacitive voltage divider.

---

The invention relates to an arrangement comprising at least two series-connected semiconductor controlled rectifiers, controlled by means of pulses applied to their control electrodes, thereby rendering it possible to connect a load circuit to a voltage source having a voltage exceeding the voltage permissible for the main current path of a single rectifier.

Such arrangements are known from "Controlled Rectifier Manual" published by General Electric Co., 1st edition, Figs 6.1 and 9.7 on pages 75 and 156, respectively.

In a series arrangement of at least two semiconductor controlled rectifiers it is inevitable that one of the rectifiers has a shorter recovery time than the other rectifier or rectifiers. Hence, from the instant at which the first mentioned rectifier is effectively blocked there is no longer a path available by which the charge stored in the other rectifier or rectifiers can flow away. Owing to this charge, a voltage peak is produced across the rectifier which is the first to block and, under certain conditions, this peak may reach an inadmissibly high value. In order to suppress these voltage peaks and to ensure ultimate blocking of the other rectifier or rectifiers, it is known, for example from page 74 of said "Controlled Rectifier Manual," to shunt each rectifier of a series arrangement by a capacitor having a capacitance which is large with respect to that of the associated rectifier, for example, a capacitor of from 0.01 to 0.05 μf. or, at high operating frequencies, of even higher capacitance value. During the recovery time and the blocking time, each of said capacitors is charged by the reverse recovery current of the associated rectifier and, subsequently, through the load circuit, by a part of the voltage of the voltage source corresponding to the number of rectifiers connected in series. When the respective rectifier is triggered again, the associated capacitor discharges through the main current path of said rectifier and, under certain conditions, the peak value of this discharge current may exceed the maximum permissible value for this rectifier. Hence, it is frequently necessary to connect a resistor of low value in series with each of said capacitors. In operation the energy dissipated in these resistors is not insignificant and, especially at high operating frequencies, it may considerably reduce the efficiency of the arrangement.

It is an object of the invention to provide another solution for the afore-mentioned difficulties, avoiding the use of ohmic resistances so that the efficiency of the arrangement is improved, particularly at high operating frequencies.

The arrangement in accordance with the invention is characterized in that the load circuit or the voltage source is subdivided into a number of sections equal to the number of the rectifiers used. The junction points of the successive series-connected sections of the load circuit or of the voltage source are connected to corresponding tappings on a capacitive voltage divider connected across the voltage source or the load circuit, respectively. The capacitive voltage divider comprises capacitors having capacitances of high values relative to that of each rectifier, the rectifiers being included in connections arranged between corresponding points of the load circuit and of the voltage source.

The invention may be used in all arrangements in which at least two series-connected semiconductor controlled rectifiers have to be included between a voltage source and a load circuit, provided that the load circuit or the voltage source can be subdivided, and especially in DC converters or inverters and in controllable rectifiers the output voltage of which can be controlled by variation of the triggering instant.

In order that the invention may readily be carried into effect, embodiments thereof will now be described, by way of example, with reference to the accompanying diagrammatic drawings, in which.

Figure 1:
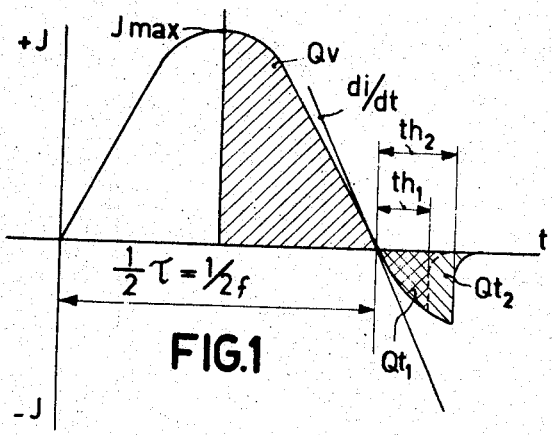
FIG. 1 is a current time diagram illustrating the problem underlying the invention.

When a semiconductor controlled rectifier has been conducting and the current flowing through it has fallen approximately to zero, the rectifier is not capable of immediately reverting to its forward blocking state. First the charge carriers stored in this rectifier must diffuse from its outer junctions and flow away in the form of a reverse current peak. The charge $Q_t$ (FIG. 1) which flows out of the rectifier in this process is dependent upon the differential quotient $di/dt$ at the instant at which the forward current becomes zero and hence upon the peak value $I_{max}$ of the forward current and upon the operating frequency $f$ of the rectifier. The ratio $Q_t/Q_v$ between the charge $Q_t$ flowing away in the reverse direction and the charge $Q_v$ passed in the forward direction during the preceding quarter cycle in each particular type of rectifier is a characteristic function of the operating frequency, however, certain differences of this value in different specimens of one type are inevitable so that in a circuit arrangement comprising two series-connected rectifiers and operating at a particular frequency $f$, one rectifier blocks again after a recovery time $t_{h1}$, after a charge $Q_{t1}$ has flowed away in the reverse direction, whereas the other rectifier blocks only after a longer recovery time $t_{h2}$, after it has delivered a charge $Q_{t2}$. To enable the second rectifier to revert to the blocking state, a path must be provided by which the load $Q_{h2} - Q_{h1}$ can flow away during the time $t_{h2} - t_{h1}$.

Figure 2:
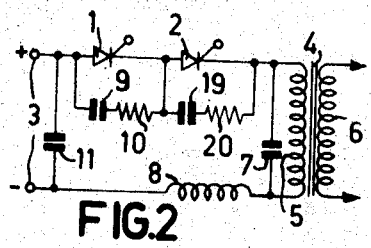
FIG. 2 is the circuit diagram of a single phase DC converter.

FIG. 2 is the circuit diagram of a DC converter comprising two series-connected semiconductor controlled rectifiers 1 and 2. A direct-voltage source 3 is connected to a load through said rectifiers. The load is the primary winding 5 of a transformer 4 shunted by a capacitor 7, this parallel combination being connected in series with an inductor 8. The rectifiers 1 and 2 are periodically rendered conductive simultaneously by forward control-current pulses applied to their control electrodes by a pulse generator (not shown) and they are rendered non-conductive each time after a half cycle $\tau/2$ of a frequency $f$ exceeding the repetition frequency of the control pulses and determined by the series resonance of the load circuit 5, 7, 8. For this purpose this load circuit forms a subcritically damped series resonant circuit, the capacitive part of which comprises the parallel combination of the capacitor 7 and the winding 5. This winding is coupled to an AC load (not shown) by means of a secondary winding 6 of the transformer 4 and hence damps the series circuit 7, 8 which with respect to the AC voltages is closed by a comparatively large capacitor 11 which shunts the DC voltage source 3. Each time the rectifiers 1 and 2 are rendered conductive a current starts to flow through the load circuit. This current increases at a rate determined by the inductor 8 and charges the capacitor 7. Owing to the provision of the inductor 8, which counteracts a decrease of the charge current which gradually has become large, the capacitor 7 is charged to a voltage higher than that of the source 3 so that after one half of the resonant cycle of the series resonant circuit the current through this circuit must reverse direction, provided that the damping by the winding 5 is not excessive. This current in the reverse direction removes the charge $Q_{t1}$ (FIG. 1) from each of the rectifiers 1 and 2.

When the rectifier (for example the rectifier 1) having the shorter recovery time $t_{h1}$ is blocked, this reverse current is abruptly interrupted. The charge $Q_{t2}-Q_{t1}$ remains in the other rectifier (for example, the rectifier 2), which consequently cannot be blocked. By the abrupt interruption of the reverse current a high reverse voltage peak is produced across the load circuit. The difference between this voltage peak and the forward voltage of the source 3 is set up across the rectifier 1 and under certain conditions may exceed the maximum permissible reverse voltage for this rectifier. On termination of this voltage peak substantially the entire voltage of the source 3 is set up across the rectifier 1 so that the second rectifier 2 is substantially ineffective.

This difficulty is overcome in known manner by connecting capacitors 9 and 19 which have large capacitances relative to the corresponding rectifiers 1 and 2 respectively in series with low ohmic resistances 10 and 20 respectively across rectifiers 1 and 2; as a result the charge $Q_{t2}-Q_{t1}$ remaining in the rectifier 1 or 2 can be taken up in the capacitor 9 or 19 through the resistor 10 or 20. The amplitude of the reverse voltage peak across the rectifier 1 (or 2) is approximately equal to:

$$\frac{(Q_{t2}-Q_{t1})}{C_9}$$

During each blocking time interval of the rectifiers 1 and 2 equal charges are supplied to the capacitors 9 and 19 and at the beginning of each conduction time interval they discharge across the respective rectifier 1 or 2. If the resistors 10 and 20 were short-circuited, these discharge currents might reach values which are inadmissibly high for the rectifiers 1 and 2 so that generally the resistors 10 and 20 are necessary. In addition they serve to suppress any parasitic oscillations of the circuit completed by the capacitors 9 and/or 19. Each time the capacitors 9 and 19 are charged and discharged considerable energy is dissipated in the resistors 10 and 20 and especially at high operating frequencies this may impair the efficiency of the arrangement.

Figure 3:
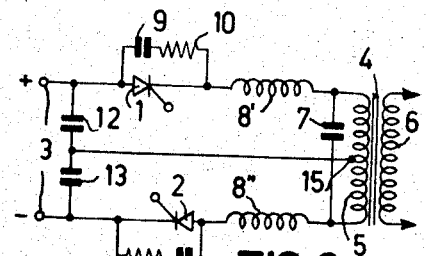
FIG. 3 is the circuit diagram of a first embodiment of the arrangement in accordance with the invention equivalent to the converter of FIG. 2.

According to the invention another path is provided by which the charge $Q_{t1}$ or $Q_{t2}$ stored in each rectifier may flow away. FIG. 3 shows the circuit diagram of a DC converter which is equivalent to that of FIG. 2 but in which the steps in accordance with the invention have been taken. The capacitors 9 and 19 and the resistors 10 and 20 are no longer absolutely necessary and may be greatly reduced or even, in some cases, omitted. The load circuit is subdivided in two sections by means of a center tapping 15 on the primary winding 5 and by subdividing the inductor 8 into two smaller inductors 8' and 8". Each section of the subdivided load circuit includes one of the two rectifiers 1 and 2 connected in series with one another, and the center tapping is directly connected to the center tapping on a capacitive voltage divider comprising two capacitors 12 and 13 which are connected in series with one another across the voltage source 3 and also replace the capacitor 11 of the arrangement of FIG. 2.

The charge $Q_{t2}-Q_{t1}$ remaining in the rectifier having the longer recovery time $t_{h2}$, for example the rectifier 2, when the other rectifier, for example the rectifier 1, is blocked, may now flow away through the inductor 8" and the lower half of the winding 5 to the tapping 15 and into the capacitor 13. The rectifier 1 is similarly shunted by the series connection of the inductor 8', the upper half of the winding 5 and the capacitor 12.

The efficiency of the arrangement of FIG. 3 is greater than that of the arrangement of FIG. 2, especially at high operating frequencies, because the circuits 8', 5, 12 and 8", 5, 13 through which the charges $Q_{t1}$ and $Q_{t2}$ respectively flow away include no resistances.

The shunting circuits 9, 10 and 19, 20 in this case only serve to suppress reverse voltage peaks produced across the inductor 8' and 8" when the associated rectifier 1 or 2 is blocked. If the operating conditions permit, they may be omitted and in any case, especially at high operating frequencies, they may be proportioned much smaller than would be necessary for absorbing the charge difference $Q_{t2}-Q_{t1}$.

Figure 4:
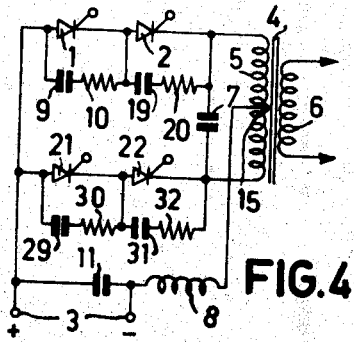
FIG. 4 is the circuit diagram of a balanced DC converter.

FIG. 4 is the circuit diagram of a balanced embodiment of a DC converter comprising two groups each consisting of two series-connected semiconductor controlled rectifiers 1, 2 and 21, 22 respectively, the rectifiers 21 and 22 being shunted by series circuits comprising a capacitor 29 or 31 and a resistor 30 or 32, respectively. The primary winding 5 of the load transformer 4 is provided with a center tapping 15 connected to the negative terminal of the DC voltage source 3 through the inductor 8 while the anodes of the rectifiers 1 and 21 the direction of forward conduction of which is away from this winding are directly connected to the positive terminal of said source. The rectifiers 1, 2 and 21, 22 are alternately rendered conductive by control pulses applied through their respective control electrodes.

Figure 5:
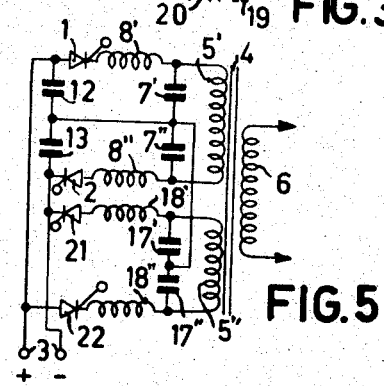
FIG. 5 is the circuit diagram of a second embodiment equivalent to the converter of FIG. 4.

FIG. 5 is the circuit diagram of an arrangement in accordance with the invention equivalent to that of FIG. 4. In this embodiment, the load circuit of the rectifiers 1 and 2, which comprises the upper half of the winding 5 and the inductor 8 of FIGURE 4, in FIG. 5 is again subdivided in two sections 5', 7' and 8' and 5', 7" 8", each section including one of the rectifiers 1 or 2. The same applies to the rectifiers 21 and 22 connected to a separator winding part 5" through inductors 18' and 18", respectively. Instead of providing a center tapping on each of the separate windings 5' and 5", the capacitors connected across the windings 5' and 5" are each subdivided into two series-connected capacitors 7', 7" and 17', 17"', respectively, and the junction points of these series circuits are connected to the center tapping on a capacitive voltage divider 12, 13 connected across the source 3. In this arrangement, the discharge paths for the rectifiers 1, 2, 21 and 22 comprise the elements 8', 7' and 12; 8", 7" and 13; 18', 17' and 13; 18", 17" and 12, respectively.

Figure 6:
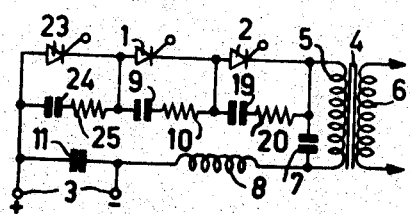
FIG. 6 is the circuit diagram of a DC converter comprising three series-connected rectifiers.

FIG. 6 shows the circuit diagram of a DC converter of the type shown in FIG. 2, however, this arrangement includes a third semiconductor controlled rectifier 23 connected in series with the rectifiers 1 and 2 and shunted by a third series circuit comprising a capacitor 24 and a resistor 25.

Figure 7:
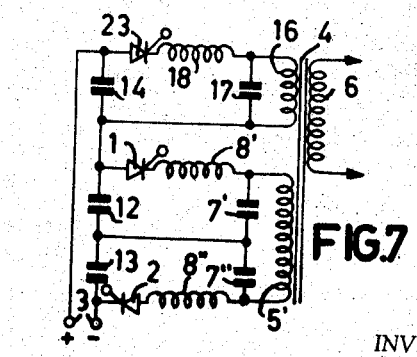
FIG. 7 is the circuit diagram of a third embodiment equivalent to the converter of FIG. 6.

FIG. 7 is the circuit diagram of an arrangement in accordance with the invention equivalent to the converter of FIG. 6. In this arrangement also the shunting elements 9, 10, 19, 20, 24, and 25 of FIG. 6 may be dispensed with owing to the subdivision of the load circuits 5, 7, 8 of FIG. 6 into three sections each including one rectifier, the junction points of the successive sections of the load circuit, which are connected in series with one another, being connected to corresponding tappings on a capacitive voltage divider which is conected across the voltage source 3 and comprises capacitors having large capacitances relative to each rectifier. The said three sections of the load circuit include an inductor 8', a winding 5' and a capacitor 7' for the rectifier 1, and inductor 8", the winding 5' and a capacitor 7" for the rectifier 2, and an inductor 18, a winding 16 and a capacitor 17 for the rectifier 23. The turns number of the winding 16 is one half of that of the winding 5' and these two windings together have the same number of turns as the winding 5 of FIG. 6. The voltage divider connected across the DC source 3 further includes a third capacitor 14 connected between the positive terminal of this source and the capacitor 12.

The anode of the rectifier 1 and the end of the winding 16 not connected to the rectifier 23 are connected to the junction of the capacitors 14 and 12. The discharge paths for the rectifiers 1 and 2 correspond to those of the rectifiers 1 and 2 (or 21 and 22) of FIG. 5 while the discharge path for the rectifier 23 includes the inductor 18, the capacitor 17 (connected in parallel with the winding 16) and the capacitor 14.

Obviously the inverters described may also be used as DC converts by connecting a rectifier, which may be followed by a smoothing filter, to the terminals of the secondary winding 6. If this winding is connected to an AC voltage source and the DC voltage source 3 is replaced by a load circuit, they may be used as controlled rectifier arrangements for producing a controllable direct voltage. In this case the control pulses applied to the control electrode of each controlled rectifier must be in synchronism with the voltage of the AC voltage source while their phases are controlled in accordance with this voltage. The elements 7 and 8 of the arrangements of the FIGURES 2, 4 and 6 and their corresponding elements 7, 8', 8" or 8', 8" and 18' 18" or 17 and 18, respectively, of the arrangements of FIGURES 3, 5 and 7 may then be dispensed with, while the elements 7', 7" and 17', 17" of FIGURES 5 and 7 are preferably replaced by center tappings on the windings 5' and 5" or 5', respectively.

What is claimed is:

1. A circuit arrangement for dissipating the stored charge on at least one of at least two semiconductor controlled rectifiers each having a cathode an anode and a triggering control electrode, comprising, means for applying a voltage to said rectifier, said voltage exceeding the maximum permissible voltage for the cathode-anode path of one of said rectifiers, a load circuit, means connecting the cathode anode path of all of said rectifiers in the same passing direction and in series with said load circuit across said means for applying a voltage, means for applying periodic triggering to trigger all of said rectifiers into conduction substantially simultaneously, first and second capacitive means connected in series across said means for applying a voltage, and means connecting each of said rectifiers to the junction point of said first and second capacitive means for dissipating the stored charge on at least one of said rectifiers.

2. A circuit arrangement comprising at least two semiconductor controlled rectifiers each having a cathode, an anode and a triggering control electrode, means for applying a voltage to said rectifiers, said voltage exceeding the maximum permissible voltage for the cathode-anode path of a single one of said rectifiers, a load circuit, means connecting the cathode anode path of all of said rectifiers in the same passing direction and in series with said load circuit across said means applying a voltage, means for periodically triggering all of said rectifiers into conduction, means for subdividing one of said voltage source and said load circuit into a number of sections equal to the number of said series-connected rectifiers, a capacitive voltage divider having a plurality of tappings and connected across the other of said voltage source and said load circuit, means connecting the junction point of the successive series-connected section to corresponding tappings on said capacitive voltage divider, said voltage divider comprising capacitors each having a capacitance of high value relative to that of each rectifier, and means connecting the cathode-anode paths of said rectifiers between corresponding points of the said voltage source and of said load circuit.

3. An arrangement as claimed in claim 2, wherein the sections of one of said voltage source and said load circuit corresponding to the rectifiers of the said pair comprise a common winding connected between the rectifiers of the said pair.

4. An arrangement as claimed in claim 3, wherein the said sections of said one of said voltage source and said load circuit corresponding to the rectifiers of said pair include two equal capacitors each having a capacitance of high value relative to that of each rectifier, said capacitors being connected in series with one another across the said common winding and their junction point being connected to the corresponding tapping of the said capacitive voltage divider.

References Cited

UNITED STATES PATENTS 3,164,767   1/1965   Morgan _____ 307—88.5
3,263,152   7/1966   Walker _____ 307—88.5

ARTHUR GAUSS, *Primary Examiner.*

D. D. FORRER, *Assistant Examiner.*